United States Patent
Kim et al.

(10) Patent No.: US 9,656,661 B2
(45) Date of Patent: May 23, 2017

(54) APPARATUS AND METHOD FOR CONTROLLING TORQUE REDUCTION OF HYBRID ELECTRIC VEHICLE

(71) Applicant: Hyundai Motor Company, Seoul (KR)

(72) Inventors: Do Hee Kim, Gyeonggi-do (KR); Gwang Il Du, Incheon (KR); Joonyoung Park, Seoul (KR); Teh Hwan Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 14/943,554

(22) Filed: Nov. 17, 2015

(65) Prior Publication Data

US 2016/0368478 A1 Dec. 22, 2016

(30) Foreign Application Priority Data

Jun. 19, 2015 (KR) .................. 10-2015-0087556

(51) Int. Cl.
*B60W 20/13* (2016.01)
*B60K 6/442* (2007.10)
(Continued)

(52) U.S. Cl.
CPC ............ *B60W 20/13* (2016.01); *B60K 6/442* (2013.01); *B60W 10/06* (2013.01); *B60W 10/08* (2013.01);
(Continued)

(58) Field of Classification Search
CPC ...... B60W 20/13; B60W 10/06; B60W 10/08; B60W 2510/244; B60W 2710/0666;
(Continued)

(56) References Cited

U.S. PATENT DOCUMENTS

| | | | | |
|---|---|---|---|---|
| 5,959,420 A | * | 9/1999 | Boberg | B60L 11/12 180/282 |
| 7,928,675 B2 | * | 4/2011 | Chen | B60L 15/025 318/400.02 |

(Continued)

FOREIGN PATENT DOCUMENTS

| | | |
|---|---|---|
| JP | 2012-091573 A | 5/2012 |
| KR | 10-2013-0064537 A | 6/2013 |
| KR | 10-1490954 B1 | 2/2015 |

*Primary Examiner* — Calvin Cheung
(74) *Attorney, Agent, or Firm* — Mintz Levin Cohn Ferris Glovsky and Popeo, P.C.; Peter F. Corless

(57) ABSTRACT

A method for controlling torque reduction of a hybrid electric vehicle including a motor and an engine as a power source includes: calculating a total request amount of torque reduction when a torque reduction is requested; calculating a driving torque contribution of the engine and a driving torque contribution of the motor when the engine is turned on; dividing the total request amount of torque reduction into an amount of engine torque reduction and an amount of motor torque reduction based on the driving torque contribution of the engine and the driving torque contribution of the motor; determining an engine torque command and a motor torque command according to the amount of engine torque reduction and the amount of motor torque reduction; and performing torque reduction according to the engine torque command and the motor torque command.

19 Claims, 4 Drawing Sheets

(51) Int. Cl.
*B60W 10/06* (2006.01)
*B60W 10/08* (2006.01)

(52) U.S. Cl.
CPC ............. *B60W 2510/244* (2013.01); *B60W 2710/0666* (2013.01); *B60W 2710/083* (2013.01); *B60W 2720/40* (2013.01); *Y10S 903/915* (2013.01)

(58) Field of Classification Search
CPC ......... B60W 2710/083; B60W 2720/40; Y10S 903/915; B60K 6/442
See application file for complete search history.

(56) References Cited

U.S. PATENT DOCUMENTS

| | | | |
|---|---|---|---|
| 8,509,980 B2 * | 8/2013 | Abe | B60K 6/48 180/65.285 |
| 8,795,131 B2 | 8/2014 | Yamazaki et al. | |
| 2003/0034188 A1 * | 2/2003 | Gotou | B60K 6/52 180/65.225 |
| 2005/0065690 A1 * | 3/2005 | Ashizawa | B60K 6/48 701/51 |
| 2007/0125083 A1 * | 6/2007 | Rollinger | B60K 6/48 60/605.1 |
| 2015/0329100 A1 * | 11/2015 | Kim | B60W 30/18172 701/22 |

* cited by examiner

APPARATUS AND METHOD FOR CONTROLLING TORQUE REDUCTION OF HYBRID ELECTRIC VEHICLE

CROSS-REFERENCE TO RELATED APPLICATION

This application claims priority to and the benefit of Korean Patent Application No. 10-2015-0087556 filed in the Korean Intellectual Property Office on Jun. 19, 2015, the entire contents of which are incorporated herein by reference.

BACKGROUND OF THE DISCLOSURE (a) Technical Field

The present disclosure relates generally to an apparatus and a method for controlling torque reduction of a hybrid electric vehicle. More particularly, the present disclosure relates to an apparatus and a method for controlling torque reduction of a hybrid electric vehicle that performs torque reduction.

(b) Description of the Related Art

Generally, a hybrid electric vehicle is driven by an engine which generates torque from fuel combustion and an electric motor which generates torque from an electric battery. The hybrid electric vehicle includes a hybrid control unit (HCU) for controlling an engine operation of the hybrid electric vehicle, an engine control unit (ECU) for controlling an operation of an engine, a motor control unit (MCU) for controlling an operation of the driving motor, a transmission control unit (TCU) for controlling an operation of the transmission, and a battery management system (BMS) for managing a condition of a battery. Among the control units, the TCU requests torque reduction for preventing an increase of an engine speed or shock of a transmission during shifting.

Meanwhile, a traction control system (TCS) is a safety system for preventing wheel spin and improving driving stability by controlling a brake and an engine while starting or during acceleration. The TCS is implemented in a typical hybrid electric vehicle and requests torque reduction when wheel spin occurs while starting or during acceleration.

When the TCU/TCS requests torque reduction as described above, conventional methods perform torque reduction using a motor torque at first for rapid control and using an engine torque as needed. However, in this case, torque reduction cannot be performed completely when the demand torque of the TCS is too low or a battery state of charge (SOC) is too high. If the demand torque of the TCS is too low, the demand torque of the TCS cannot be satisfied by using the motor only; if the battery SOC is too high, the motor cannot output sufficient negative torque.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide an apparatus and a method for controlling torque reduction of a hybrid electric vehicle having advantages of performing torque reduction by dividing a total request amount of torque reduction into an amount of engine torque reduction and an amount of motor torque reduction based on driving torque contributions of the engine and the motor.

Embodiments of the present disclosure provide a method for controlling torque reduction of a hybrid electric vehicle including a motor and an engine as power sources that includes: calculating a total request amount of torque reduction when a torque reduction is requested; calculating a driving torque contribution of the engine and a driving torque contribution of the motor when the engine is turned on; dividing the total request amount of torque reduction into an amount of engine torque reduction and an amount of motor torque reduction based on the driving torque contribution of the engine and the driving torque contribution of the motor; determining an engine torque command and a motor torque command according to the amount of engine torque reduction and the amount of motor torque reduction; and performing torque reduction according to the engine torque command and the motor torque command.

The method may further include after the dividing of the total request amount of torque reduction into the amount of engine torque reduction and the amount of motor torque reduction: calculating an additional amount of available motor torque reduction; calculating an actual amount of engine torque reduction and an actual amount of motor torque reduction based on the additional amount of available motor torque reduction; and determining the engine torque command and the motor torque command according to the actual amount of engine torque reduction and the actual amount of motor torque reduction.

The additional amount of available motor torque reduction may be calculated by considering a charging limit of the motor based a battery state of charge (SOC).

The actual amount of engine torque reduction may be calculated by subtracting the additional amount of available motor torque reduction from the amount of engine torque reduction.

The actual amount of motor torque reduction may be calculated by adding the amount of motor torque reduction to the additional amount of available motor torque reduction.

The driving torque contribution of the engine may be calculated by dividing an engine torque by a sum of the engine torque and a motor torque.

The driving torque contribution of the motor may be calculated by subtracting the driving torque contribution of the engine from 1.

The method may further include, when the engine is not turned on: calculating an available amount of motor torque reduction; calculating the actual amount of motor torque reduction based on the available amount of motor torque reduction; and determining the motor torque command according to the actual amount of motor torque reduction.

The available amount of motor torque reduction may be calculated based on a charging limit of the motor according to a battery SOC.

Furthermore, according to embodiments of the present disclosure, an apparatus for controlling torque reduction of a hybrid electric vehicle includes: a driving information detector detecting a running state of the vehicle and demand information of a driver of the vehicle; and a controller configured to: i) perform torque reduction by controlling an engine output torque and a motor output torque when a torque reduction is requested based on a signal from the driving information detector, ii) calculate a total request amount of torque reduction, iii) divide the total request amount of torque reduction into an amount of engine torque reduction and an amount of motor torque reduction by calculating a driving torque contribution of the engine and a driving torque contribution of the motor when the engine is turned on, and iv) determine an engine torque command and a motor torque command according to the amount of engine torque reduction and the amount of motor torque reduction.

The controller may calculate an actual amount of engine torque reduction and an actual amount of motor torque reduction based on an additional amount of available motor torque reduction and determine the engine torque command and the motor torque command according to the actual amount of engine torque reduction and the actual amount of motor torque reduction.

The controller may calculate the additional amount of available motor torque reduction based on a charging limit of the motor according to a battery SOC.

The controller may calculate the actual amount of engine torque reduction by subtracting the additional amount of available motor torque reduction from the amount of engine torque reduction.

The controller may calculate the actual amount of motor torque reduction by adding the amount of motor torque reduction to the additional amount of available motor torque reduction.

The controller may calculate the driving torque contribution of the engine by dividing an engine torque by a sum of the engine torque and a motor torque.

The controller may calculate the driving torque contribution of the motor by subtracting the driving torque contribution of the engine from 1.

The controller may calculate an available amount of motor torque reduction when the engine is not turned on and determine the motor torque command by calculating the actual amount of motor torque reduction based on the available amount of motor torque reduction.

The controller may calculate the available amount of motor torque reduction based on a charging limit of the motor according to a battery SOC.

Furthermore, according to embodiments of the present disclosure, a non-transitory computer readable medium containing program instructions for controlling torque reduction of a hybrid electric vehicle, in which a driving information detector detects a running state of the vehicle and demand information of a driver of the vehicle, includes: program instructions that perform torque reduction by controlling an engine output torque and a motor output torque when a torque reduction is requested based on a signal from the driving information detector; program instructions that calculate a total request amount of torque reduction; program instructions that divide the total request amount of torque reduction into an amount of engine torque reduction and an amount of motor torque reduction by calculating a driving torque contribution of the engine and a driving torque contribution of the motor when the engine is turned on, and program instructions that determine an engine torque command and a motor torque command according to the amount of engine torque reduction and the amount of motor torque reduction.

As described above, according to embodiments of the present disclosure, an amount of torque reduction is calculated based on driving torque contributions of the engine and the motor, so a demand torque can be rapidly satisfied after torque reduction. Accordingly, fuel efficiency and torque responsiveness of the hybrid electric vehicle can be improved. In addition, an amount of engine torque reduction and an amount of motor torque reduction is adjusted based on an additional amount of available motor torque reduction, so charging energy of the motor can be additionally secured and battery SOC can be efficiently managed.

DETAILED DESCRIPTION OF THE EMBODIMENTS

Figure 1:
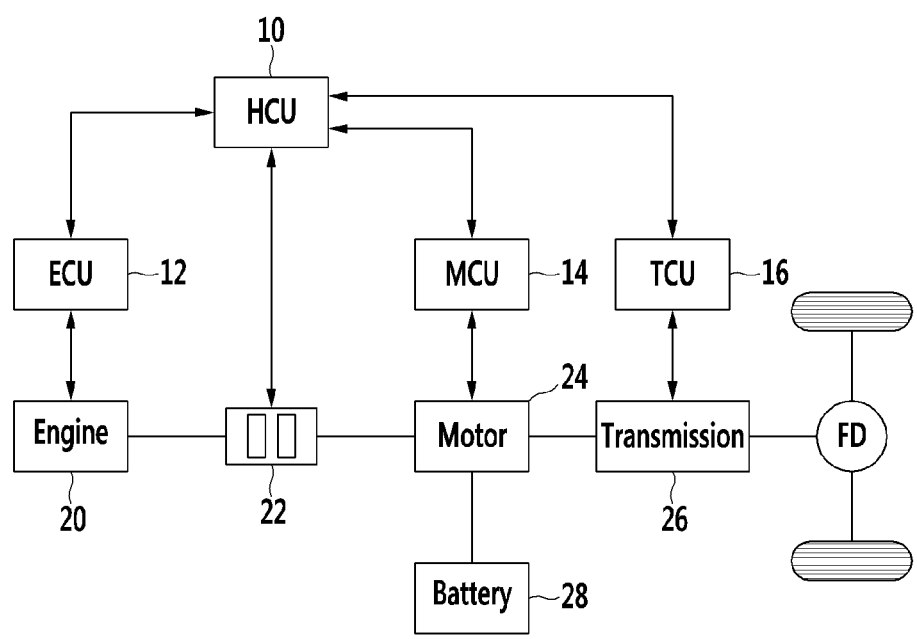
FIG. 1 is a schematic diagram of a hybrid system to which a method for controlling torque reduction of a hybrid electric vehicle is applied according to embodiments of the present disclosure.

In the following detailed description, only certain embodiments of the present disclosure have been shown and described, simply by way of illustration. As those skilled in the art would realize, the described embodiments may be modified in various different ways, all without departing from the spirit or scope of the present disclosure. Like reference numerals designate like elements throughout the specification.

Throughout this specification and the claims which follow, unless explicitly described to the contrary, the word "comprise" and variations such as "comprises" or "comprising" will be understood to imply the inclusion of stated elements but not the exclusion of any other elements. Further, the singular forms "a", "an" and "the" are intended to include the plural forms as well, unless the context clearly indicates otherwise.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the controller of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Embodiments of the present disclosure will hereinafter be described in detail with reference to the accompanying drawings.

FIG. 1 is a schematic diagram of a hybrid system to which a method for controlling torque reduction of a hybrid electric vehicle is applied according to embodiments of the present disclosure.

The hybrid system as shown in FIG. 1 is illustrated for better comprehension and ease of description of the disclosed embodiments. Therefore, a method for controlling engine starting while shifting of a hybrid electric vehicle according to embodiments of the present disclosure may not only be applied to the hybrid system as shown in FIG. 1, but may also be applied to all other hybrid systems.

As shown in FIG. 1, the hybrid system to which a method for controlling torque reduction of a hybrid electric vehicle is applied according to embodiments of the present disclosure includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on, as is generally known in the art.

The engine clutch 22 is disposed between the engine 20 and the motor 24 to receive a control signal of the HCU 10, and selectively connect the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects any shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

A detailed explanation of the hybrid system as described above will be omitted.

Figure 2:
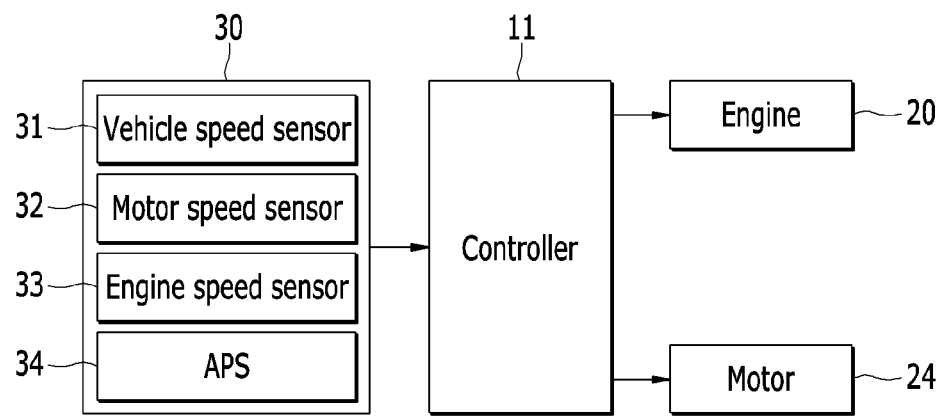
FIG. 2 is a block diagram of an apparatus for controlling torque reduction of a hybrid electric vehicle according to embodiments of the present disclosure.

FIG. 2 is a block diagram of an apparatus for controlling torque reduction of a hybrid electric vehicle according to embodiments of the present disclosure.

As shown in FIG. 2, an apparatus for controlling torque reduction of a hybrid electric vehicle according to embodiments of the present disclosure includes a driving information detector 30, a controller 11, an engine 20 and a motor 24.

Processes in the method for controlling torque reduction of the hybrid electric vehicle according to embodiments of the present disclosure to be described below may be performed by integrating or subdividing due to each controller. Therefore, for convenience of description, in this specification and claims, many controllers provided in the hybrid electric vehicle are called the controller 11.

The hybrid electric vehicle to which embodiments of the present disclosure are applied includes at least one engine 20 and at least one motor 24. In addition, the hybrid electric vehicle provides a driving mode in which the engine 20 and the motor 24 operate separately or simultaneously as a power source. For this purpose, the engine clutch is disposed between the engine 20 and the motor 24 to selectively connect the engine 20 and the motor 24.

The driving information detector 30 detects a running state of the hybrid electric vehicle and demand information of a driver and includes a vehicle speed sensor 31, a motor speed sensor 32, an engine speed sensor 33 and an accelerator pedal position sensor (APS) 34.

The vehicle speed sensor 31 detects a speed of the vehicle, and transmits a corresponding signal to the controller 11.

The motor speed sensor 32 detects a rotation speed of the motor 24, and transmits a corresponding signal to the controller 11.

The engine speed sensor 33 detects a rotation speed of the engine 20, and transmits a corresponding signal to the controller 11.

The accelerator pedal position sensor 34 continuously detects a position value of an accelerator pedal and transmits a monitoring signal to the controller 11. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 34. Therefore, for the purposes of the present disclosure, the accelerator pedal position sensor 34 should include the throttle valve position sensor, and the position value of the accelerator pedal should be understood to be an opening value of the throttle valve.

The controller 11 performs torque reduction by controlling an engine output torque and a motor output torque when a torque reduction is requested based on a signal from the driving information detector 30. The controller 11 may calculate a total request amount of torque reduction and divide the total request amount of torque reduction into an amount of engine torque reduction and an amount of motor torque reduction by calculating driving torque contribution of the engine and the motor when the engine 20 is turned on. In addition, the controller 11 may control the engine output torque and the motor output torque by determining an engine torque command and a motor torque command according to the amount of engine torque reduction and the amount of motor torque reduction. For these purposes, the controller 11 may be implemented as at least one processor that is operated by a predetermined program, as described above, and the predetermined program may be programmed in order to perform each step of a method for controlling torque reduction of a hybrid electric vehicle according to embodiments of the present disclosure.

Various embodiments described herein may be implemented within a recording medium that may be read by a computer or a similar device by using software, hardware, or a combination thereof, for example.

According to a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions. According to a software implementation, embodiments such as procedures and functions described in the present embodiments may be implemented by separate software modules. Each of the software modules may perform one or more functions and operations described in the present disclosure. Software code may be implemented by a software application written in an appropriate program language.

Hereinafter, a method for controlling torque reduction of the hybrid electric vehicle according to embodiments of the present disclosure will be described in detail with reference to FIG. 3 and FIG. 4.

Figure 3:
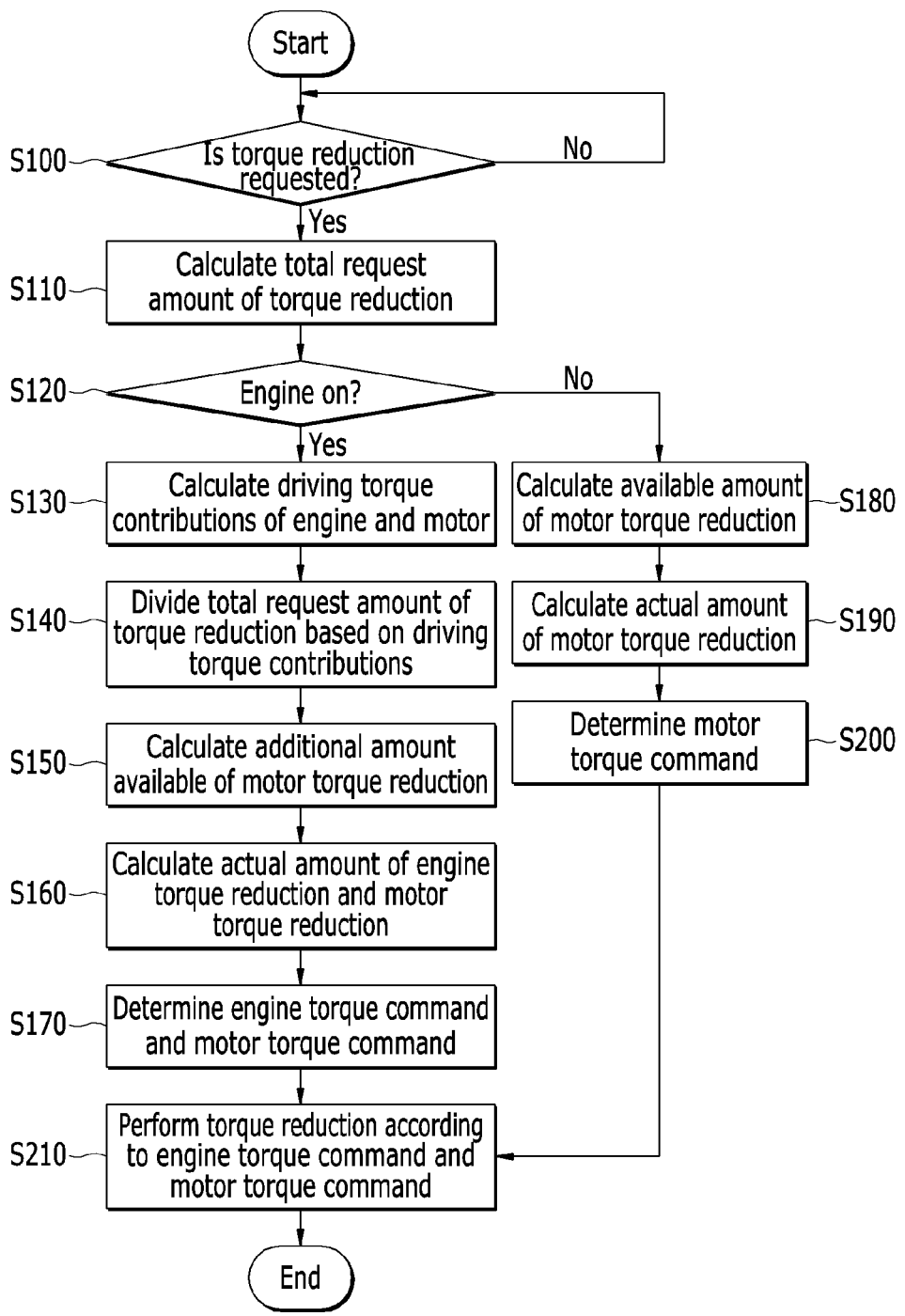
FIG. 3 is a flowchart showing a method for controlling torque reduction of a hybrid electric vehicle according to embodiments of the present disclosure.

FIG. 3 is a flowchart showing a method for controlling torque reduction of the hybrid electric vehicle according to embodiments of the present disclosure.

As shown in FIG. 3, a method for controlling torque reduction of the hybrid electric vehicle according to embodiments of the present disclosure begins with the controller 11 determining whether torque reduction is requested at step S100.

When the torque reduction is requested at the step S100, the controller 11 calculates a total request amount of torque reduction at step S110.

The total request amount of torque reduction may be calculated on the basis of a signal from the driving information detector 30. That is, the total request amount of torque reduction may be calculated by a current engine torque, a current motor torque, and an amount of torque limit.

When the total request amount of torque reduction is calculated at the step S110, the controller 11 determines whether the engine 20 is turned on at step S120.

When the engine 20 is turned on at the step S120, the controller 11 calculates a driving torque contribution of the engine 20 and a driving torque contribution of the motor 24 at step S130.

The driving torque contribution of the engine 20 may be calculated by dividing an engine torque by a sum of the engine torque and a motor torque. Herein, the motor torque may be set as 0 when the motor 24 is charged. Meanwhile, the driving torque contribution of the motor 24 may be calculated by subtracting the driving torque contribution of the engine from 1.

When the driving torque contributions of the engine 20 and the motor 24 are calculated at the step S130, the controller 11 divides the total request amount of torque reduction calculated at the step S110 into an amount of engine torque reduction and an amount of motor torque reduction based on the driving torque contributions of the engine 20 and the motor 24 at step S140. That is, the controller 11 may calculate the amount of engine torque reduction by multiplying the total request amount of torque reduction by the driving torque contribution of the engine 20. Also, the controller 11 may calculate the amount of motor torque reduction by multiplying the total request amount of torque reduction by the driving torque contribution of the motor 24.

After that, the controller 11 calculates an additional amount available of motor torque reduction to secure additional charging energy and manage battery SOC at step S150. The additional amount available of motor torque reduction may be calculated based on a charging limit of the motor according to a battery SOC.

When the additional amount available of motor torque reduction is calculated at the step S150, the controller 11 calculates an actual amount of engine torque reduction and an actual amount of motor torque reduction at step S160. The actual amount of engine torque reduction may be calculated by subtracting the additional amount available of motor torque reduction from the amount of engine torque reduction, and the actual amount of motor torque reduction may be calculated by adding the amount of motor torque reduction to the additional amount available of motor torque reduction.

When the actual amount of engine torque reduction and the actual amount of motor torque reduction is calculated at the step S160, the controller 11 determines an engine torque command and a motor torque command according to the actual amount of engine torque reduction and the actual amount of motor torque reduction at step S170.

On the other hand, when the engine 20 is not turned on at the step S120, the controller 11 should perform torque reduction by only using the motor 24. Therefore, the controller 11 calculates an available amount of motor torque reduction at step S180. The available amount of motor torque reduction may be calculated based on a charging limit of the motor according to a battery SOC.

When the available amount of motor torque reduction is calculated at the step S180, the controller 11 calculates the actual amount of motor torque reduction based on the available amount of motor torque reduction at step S190.

When the actual amount of motor torque reduction is calculated at the step S190, the controller 11 determines the motor torque command according to the actual amount of motor torque reduction at step S200.

Accordingly, when the engine torque command and the motor torque command are determined at the step S170 or the step S200, the controller 11 performs torque reduction according to the engine torque command and the motor torque command at step S210.

Figure 4:
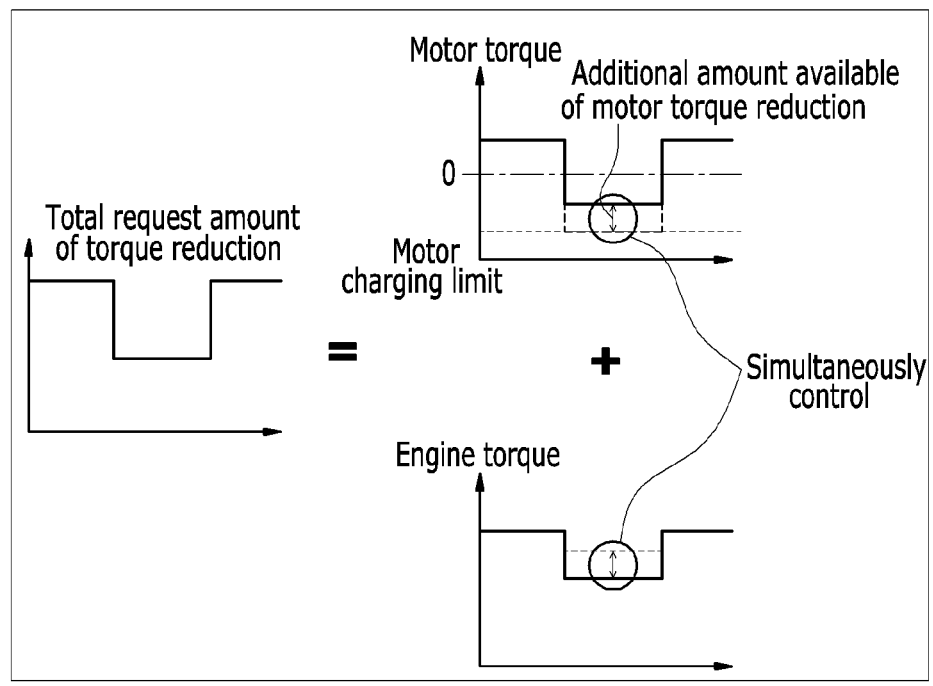
FIG. 4 is a diagram showing an amount of torque reduction to which a method for controlling torque reduction of a hybrid electric vehicle is applied according to embodiments of the present disclosure.

FIG. 4 is a diagram showing an amount of torque reduction to which a method for controlling torque reduction of a hybrid electric vehicle is applied according to embodiments of the present disclosure.

As shown in FIG. 4, the controller 11 calculates a total request amount of torque reduction, and divides the total request amount of torque reduction into an amount of engine torque reduction and an amount of motor torque reduction. After that, the controller 11 controls an engine output torque and a motor output torque to satisfy the total request amount of torque reduction.

For example, in case that the engine torque is 100 Nm, the motor torque is 20 Nm, and the charging limit torque of the motor is −30 Nm will be described. If a minimum torque for driving is 50 Nm, the total request amount of torque reduction would be 50 Nm−(100 Nm+20 Nm)=−70 Nm.

Then, the driving torque contribution of the engine 20 may be calculated as 100 Nm/(100 m+20 Nm)=0.83, the driving torque contribution of the motor 24 may be calculated as 1−0.83=0.17. Therefore, the amount of engine torque reduction based on the driving torque contribution of the engine 20 is −70 Nm*0.83=−58.33 Nm (the total request amount of torque reduction*the driving torque contribution of the engine 20). Also, the amount of motor torque reduction based on the driving torque contribution of the motor 24 is −70 Nm*0.17=−11.67 Nm (the total request amount of torque reduction*the driving torque contribution of the motor 24).

Meanwhile, the additional amount available of motor torque reduction may be calculated by subtracting the amount of motor torque reduction based on the driving torque contribution of the motor 24 from the charging limit torque of the motor and multiplying a factor A according to the SOC of the battery. Thus, according to above description, the additional amount available of motor torque reduction is [−30 Nm−(20 Nm−11.67 Nm)]*A=−38.33 A Nm. Accordingly, the actual amount of engine torque reduction is (−58.33+38.33 A)Nm, and the actual amount of motor torque reduction is (−11.67−38.33 A)Nm. Eventually, a sum of the actual amount of engine torque reduction and the actual amount of motor torque reduction is (−58.33+38.33 A)Nm+(−11.67−38.33 A)Nm=−70 Nm, so the total request amount of torque reduction can be satisfied.

As described above, according to embodiments of the present disclosure, an amount of torque reduction is calculated based on driving torque contributions of the engine and the motor, so a demand torque can be rapidly satisfied after torque reduction. Accordingly, fuel efficiency and torque responsiveness of the hybrid electric vehicle can be improved. In addition, an amount of engine torque reduction and an amount of motor torque reduction is adjusted based on an additional amount available of motor torque reduction, so charging energy of the motor can be additionally secured and battery SOC can be efficiently managed.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A method for controlling torque reduction of a hybrid electric vehicle including a motor and an engine as power sources, comprising:
    calculating a total request amount of torque reduction when a torque reduction is requested;
    calculating a driving torque contribution of the engine and a driving torque contribution of the motor when the engine is turned on;
    dividing the total request amount of torque reduction into an amount of engine torque reduction and an amount of motor torque reduction based on the driving torque contribution of the engine and the driving torque contribution of the motor;
    determining an engine torque command and a motor torque command according to the amount of engine torque reduction and the amount of motor torque reduction; and
    performing torque reduction according to the engine torque command and the motor torque command.

2. The method of claim 1, further comprising, after the dividing of the total request amount of torque reduction:
    calculating an additional amount of available motor torque reduction;
    calculating an actual amount of engine torque reduction and an actual amount of motor torque reduction based on the additional amount of available motor torque reduction; and
    determining the engine torque command and the motor torque command according to the actual amount of engine torque reduction and the actual amount of motor torque reduction.

3. The method of claim 2, wherein the additional amount of available motor torque reduction is calculated based on a charging limit of the motor according to a battery state of charge (SOC).

4. The method of claim 3, wherein the actual amount of engine torque reduction is calculated by subtracting the additional amount of available motor torque reduction from the amount of engine torque reduction.

5. The method of claim 3, wherein the actual amount of motor torque reduction is calculated by adding the amount of motor torque reduction to the additional amount of available motor torque reduction.

6. The method of claim 1, wherein the driving torque contribution of the engine is calculated by dividing an engine torque by a sum of the engine torque and a motor torque.

7. The method of claim 6, wherein the driving torque contribution of the motor is calculated by subtracting the driving torque contribution of the engine from 1.

8. The method of claim 1, further comprising, when the engine is not turned on:
    calculating an available amount of motor torque reduction;
    calculating the actual amount of motor torque reduction based on the available amount of motor torque reduction; and
    determining the motor torque command according to the actual amount of motor torque reduction.

9. The method of claim 8, wherein the available amount of motor torque reduction is calculated based on a charging limit of the motor according to a battery SOC.

10. An apparatus for controlling torque reduction of a hybrid electric vehicle, comprising:
    a driving information detector detecting a running state of the vehicle and demand information of a driver of the vehicle; and
    a controller configured to: i) perform torque reduction by controlling an engine output torque and a motor output torque when a torque reduction is requested based on a signal from the driving information detector, ii) calculate a total request amount of torque reduction, iii) divide the total request amount of torque reduction into an amount of engine torque reduction and an amount of motor torque reduction by calculating a driving torque contribution of the engine and a driving torque contribution of the motor when the engine is turned on, and iv) determine an engine torque command and a motor torque command according to the amount of engine torque reduction and the amount of motor torque reduction.

11. The apparatus of claim 10, wherein the controller is further configured to calculate an actual amount of engine torque reduction and an actual amount of motor torque reduction based on an additional amount of available motor torque reduction and determine the engine torque command and the motor torque command according to the actual amount of engine torque reduction and the actual amount of motor torque reduction.

12. The apparatus of claim 11, wherein the controller is further configured to calculate the additional amount of available motor torque reduction based on a charging limit of the motor according to a battery SOC.

13. The apparatus of claim 12, wherein the controller is further configured to calculate the actual amount of engine torque reduction by subtracting the additional amount of available motor torque reduction from the amount of engine torque reduction.

14. The apparatus of claim 12, wherein the controller is further configured to calculate the actual amount of motor torque reduction by adding the amount of motor torque reduction to the additional amount of available motor torque reduction.

15. The apparatus of claim 10, wherein the controller is further configured to calculate the driving torque contribution of the engine by dividing an engine torque by a sum of the engine torque and a motor torque.

16. The apparatus of claim 15, wherein the controller is further configured to calculate the driving torque contribution of the motor by subtracting the driving torque contribution of the engine from 1.

17. The apparatus of claim 10, wherein the controller is further configured to calculate an available amount of motor torque reduction when the engine is not turned on and determine the motor torque command by calculating the actual amount of motor torque reduction based on the available amount of motor torque reduction.

18. The apparatus of claim 17, wherein the controller is further configured to calculate the available amount of motor torque reduction based on a charging limit of the motor according to a battery SOC.

19. A non-transitory computer readable medium containing program instructions for controlling torque reduction of a hybrid electric vehicle, in which a driving information detector detects a running state of the vehicle and demand information of a driver of the vehicle, the computer readable medium comprising:
  program instructions that perform torque reduction by controlling an engine output torque and a motor output torque when a torque reduction is requested based on a signal from the driving information detector;
  program instructions that calculate a total request amount of torque reduction;
  program instructions that divide the total request amount of torque reduction into an amount of engine torque reduction and an amount of motor torque reduction by calculating a driving torque contribution of the engine and a driving torque contribution of the motor when the engine is turned on, and
  program instructions that determine an engine torque command and a motor torque command according to the amount of engine torque reduction and the amount of motor torque reduction.

* * * * *